2,893,815

DIAZOTIZABLE AMINE COMPOSITIONS

Lester N. Stanley and Frederick W. Posselt, Delmar, N.Y.

No Drawing. Application December 31, 1956
Serial No. 631,478

15 Claims. (Cl. 8—44)

This invention relates to diazotizable amine compositions, and more particularly to the provision of a stable dispersion of a diazotizable primary amine, which dispersion upon acidification reacts to form a solution of a diazonium compound capable of coupling with an azo coupling component to form an azo dyestuff.

In the well known art of dyeing and printing fibers with ice colors, otherwise known as azoic dyeing and printing, or in the preparation of azo dyestuffs devoid of solubilizing groups, the general practice is to prepare a dilute solution or suspension of a diazotizable primary amine compound devoid of solubilizing groups such as sulfonic and carboxylic acid groups, in water containing a considerable excess of mineral acid. The diazotizable primary amine is then diazotized at a low temperature such as 0° to 5° C. by adding a suitable amount of an alkali metal nitrite. The concentration and pH of the resulting solution of the diazo compound is then generally adjusted and employed for reaction with an ice color coupling component to produce the desired azo dyestuff in situ on the fiber or on a carrier or substratum or the like. This procedure requires skill and time and often causes difficulties for the dyer or printer as well as unsatisfactory results. Because of the substantial insolubility of the diazotizable amines in water and dilute mineral acids, difficulty is encountered in producing a solution or suspension of the amine base of as high a concentration as is ordinarily desired for complete and rapid diazotization. Proper calculations and measurements and proper weighing or measuring, reaction, and cooling equipment are required.

It has been proposed to supply the dyer with diazonium salts, some few of which are sufficiently stable per se, but most of which are stabilized as double salts, such as those of zinc chloride, cadmium chloride, tin chloride, fluoroborates, etc., or as diazonium aryl sulfonates, such as those of naphthalene mono-, di- and trisulfonic acids. It has also been proposed to supply the dyer with an alkaline solution containing a diazotizable primary amine compound and a diazotization agent, namely an alkali metal nitrite, which solution on acidification yields a freshly prepared, active diazonium compound. These and other proposals have not been entirely satisfactory for various reasons including a certain degree of instability, difficulty in diazotization, concentrations not as high as could be desired, tendencies to tar or foam on dyeing, and the like.

It is an object of this invention to provide a stable solution or dispersion containing a diazotizable primary amine devoid of solubilizing groups, which dispersion upon acidification reacts to form an aqueous solution of the diazo compound of said amine. Other objects and advantages will appear as the description proceeds.

The above objects are attained by the instant invention which is based upon the provision of a composition having a pH of at least about 7 comprising, approximately by weight, 5 to 35% of a diazotizable aromatic primary amine compound devoid of solubilizing groups, a nitrite component selected from the group consisting of nitrous acid salts of non-aromatic secondary and tertiary amines and at least 50% mixtures thereof with an alkali metal nitrite, the total nitrite being in an amount at least sufficient to diazotize said diazotizable primary amine compound on acidification, and an amount of an inert, organic, water-miscible solvent for said diazotizable primary amine compound sufficient to yield a substantially stable liquid dispersion. It has been found that such dispersion is substantially clear and stable during storage, diazotizes rapidly and without formation of undesirable by-products on acidification, and yields diazo solutions which form a minimum of tar or foam during dyeing.

The diazotizable primary amine compounds operative in the compositions of the instant invention are those generally employed in producing azoic dyestuffs, namely aromatic carbocyclic and heterocyclic primary amines which are devoid of solubilizing groups such as carboxylic and sulfonic acid groups. Included among such compounds are anilines, xenylamines, naphthylamines, benzidines, aminocarbazoles, aminofuranes, aminothiazoles, aminodiphenylsulfones, aminodiphenyl ethers, aminobenzophenones, aminofluorenones, aminoazo compounds, and their chloro, nitro, lower alkyl and alkoxy, cyano, acylamido, sulfon, sulfamyl, N-lower alkyl sulfamyl, carbamyl and N-lower alkyl carbamyl derivatives and the like. As specific examples of some suitable ice color diazo base components, there may be mentioned aminoazotoluene, 4-chloro-2-nitroaniline, 5-chloro-o-toluidine, 4-nitro-o-toluidine, 2,5-dichloroaniline, 4-benzamido-2,5-diethoxyaniline, 4-methyl-m-anisidine, 4-nitro-o-anisidine, 4-chloro-o-anisidine, 1-aminonaphthalene, 1-aminoanthraquinone, dianisidine, 5-chloro-4-nitro-o-anisidine, aminobenzophenone, aminodiphenylsulfone, 2,6-dichloro-1,4-phenylenediamine, 3,3′-diaminodiphenyl urea, benzidine, 4,4′-diaminostilbene, 4-carbomethoxy-amino-2,5-diethoxyaniline, 3-aminobenzotrifluoride, 2-amino - 5 - trifluoromethylphenyl methyl sulfone, o-phenetol-azo-α-naphthylamine, 3-aminocarbazole, aminofurane and similar carbocylic and heterocyclic compounds containing at least one diazotizable primary amine group. These compounds are preferably employed in as high a concentration as possible or feasible, up to saturation which usually ranges from about 5 to 35% by weight in the dispersion or solution.

The nitrous acid salts of secondary and tertiary amines, also referred to as organic ammonium nitrites, operative as diazotization agents in the compositions of the instant invention must be stable and soluble in neutral or alkaline solution and must not form compounds capable of coupling upon acidification. They may in general be produced by contacting the hydrochloride of a suitable secondary or tertiary amine devoid of aromatically bound amino groups with sodium nitrite in a solution in which the desired nitrous acid salt is insoluble, the reaction yielding, by double decomposition, the nitrous acid salt as a precipitate and leaving an inorganic chloride in solution. Another method involves passing hydrogen chloride gas through an acetone solution of the secondary or tertiary amine to form a precipitate of the amine hydrochloride. Silver nitrite is then mixed with the amine hydrochloride in acetone yielding an acetone solution of the nitrous acid salt of the amine and a silver chloride precipitate which is filtered off. The filtrate is evaporated to obtain the desired nitrous acid salt. Other methods are known.

In general, the secondary and tertiary amines employed in producing the desired nitrous acid salts have the formula $NR^1R^2R^3$ wherein $R^1$ and $R^2$ are hydrocarbon radicals which may be aliphatic or alicyclic, or when taken together, the atoms necessary to complete a 5 to 6 membered heterocycle; and $R^3$ may be hydrogen, aliphatic, alicyclic or heterocyclic. More specifically, $R^1$ and $R^2$ may be lower alkyl, cycloalkyl, aralkyl, and, when taken together, heterocyclic; and $R^3$ may be hydrogen, lower alkyl, cycloalkyl, and aralkyl. As examples of suitable secondary and tertiary amines useful in forming the desired nitrous acid salts, there may be mentioned dimethylamine, diethylamine, diisopropylamine, diamylamine, dioctylamine, methyl butylamine, methyl isobutylamine, methyl amylamine, amylhexylamine, triethylamine, triisopropylamine, N-methyl cyclohexylamine, N,N-dimethyl cyclohexylamine, dicyclohexylamine, methyl benzylamine, propylbenzylamine, dibenzylamine, di-(β-phenylethyl) amine, piperidine, piperazine, morpholine, and various other 1,4- and 1,3-oxazines such as 2,4,4,6-tetramethyltetrahydro-1,3-oxazine, dihydro-1,3-oxazine, 5,6-dihydro-4-methyl-1,3-oxazine, 6-isopropyltetrahydro-1,3-oxazine, dihydro-1,4-oxazine, 3-ethyltetrahydro-1,4-oxazine, 2,2,3,5,6-pentamethyl tetrahydro-1,4-oxazine, 2-methyl-5-ethyl-6-propyltetrahydro-1,4-oxazine, 2-chlorotetrahydro-1,4-oxazine, 3-hydroxymethyl-tetrahydro-1,4-oxazine, and the like. The resulting nitrous acid salts employed in the compositions of the instant invention will accordingly in general have the formula

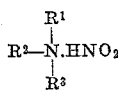

in which $R^1$, $R^2$, $R^3$ have the values given above. It will be understood that $R^1$, $R^2$ and $R^3$ may contain stable and inert polar substituents such as chlorine, ether, sulfide, alcohol groups and the like.

The above described nitrous acid salts of secondary and tertiary amines are employed in at least an equimolar amount relative to the diazotizable amine compound and, if desired when the diazotizable amine compound contains more than one diazotizable primary amine group, such an amount multiplied by the number of such primary amine groups, such amount being in all cases sufficient to diazotize the diazotizable primary amine compound present in the solution upon acidification. If desired, up to about 50% of the nitrous acid salt may be replaced by the known alkali metal nitrite diazotization agents such as sodium nitrite and potassium nitrite. It is preferred to employ no more than a 15% molar excess, relative to the diazotizable primary amine, of the organic ammonium nitrite or its combination with alkali metal nitrite.

As representative of the inert, organic, water-miscible solvents for the diazotizable primary amine compound employed in the instant invention, there may be mentioned organic alcohols such as methanol, ethanol, propanol, and butanol, ethylene glycol, diethylene glycol, propylene glycol and 1,4-butanediol and their methyl, ethyl, propyl and butyl ethers, cyclohexanol, dimethylsulfoxide, amides such as the mono- and di-methyl-, -ethyl-, -propyl-, -isopropyl-, -butyl-, -isobutyl- and -hydroxyethyl- formamides, -acetamides, -methoxyacetamides, and -glycolamides, preferably dimethyl formamide, and the N-lower alkyl-2-pyrrolidones. These N-lower alkyl-2-pyrrolidones correspond to the formula

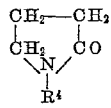

wherein $R^4$ is an alkyl radical of from 1 to 4 carbon atoms such as ethyl, propyl, isopropyl, butyl, isobutyl and especially methyl. It will be understood that one or more hydrogen atoms in the cyclic methylene groups of the above formula may be substituted by a lower alkyl group such as methyl or ethyl or the like. Such pyrrolidones and their methods of production are well known in the art and no claim is made thereto per se.

The above defined inert, organic, water-miscible solvents or mixtures thereof, are employed in amounts sufficient to form a substantially stable liquid dispersion which amounts usually range from about 5 to 45% by weight of the dispersion. It will be understood that the term "dispersion" is employed herein in its broad sense to include solutions and stable emulsions and/or suspensions in which the dispersed particles are sufficiently fine to permit rapid dispersion and diazotization upon acidification. The formation of a stable liquid dispersion usually, but not necessarily, requires from about 1 to 3, and preferably about 2 parts of water for each part of the nitrite component, namely the nitrous acid salt of a secondary or tertiary amine as above defined or its mixture with an alkali metal nitrite.

As a further feature of this invention, it has been found that still further improved results with respect to dispersibility, stability and reduction in water content are obtained by inclusion in the compositions of the instant invention of about 10 to 50% by weight of a mixture of a nonionic surface active agent containing a polyoxyalkylene chain and derived from a reactive hydrogen-containing compound, and a water-soluble cationic surface active quaternary ammonium compound, said mixture containing about 0.2 to 1 part of said cationic compound for each part of said nonionic agent. Preferably, the instant compositions contain about 10 to 25% of the nonionic surface active agent and about 2 to 10% of the cationic surface active compound, by weight.

The non-ionic surface active agents operative in the compositions of the instant invention are well known in the art. They are generally produced by introducing into a water-insoluble organic compound containing at least one reactive hydrogen atom, a polyglycol radical having at least two oxyalkylene groups. As initial materials containing at least one reactive hydrogen atom, there may be mentioned water-insoluble carboxylic and sulfonic acids, alcohols, thiols, phenols, hydroxycarboxylic acids, carboxylic and sulfonic acid amides, primary and secondary amines, hydroxyalkylamines, and the like. Those preferred are the higher fatty acids.

Specific examples of reactive hydrogen-containing compounds include mono- or polycarboxylic acids of from 6 to 30 carbon atoms, such as caproic, lauric, palmitic, stearic, oleic, ricinoleic, montanic, abietic and naphthenic acids and mixtures of the same, or those produced from waxes and oils or by oxidation of petroleum fractions. Instead of the free acids their esters with polyhydric alcohols may be used, such as their glycerides. Alcohols include those containing at least six carbon atoms, such as hexyl, octyl, dodecyl, octadecyl, oleyl, octadecanediol, abietyl alcohol and partial ethers and esters of polyhydric alcohols such as glycerol, and those multi-branched chain primary aliphatic alcohols produced by the Oxo process from olefins or polyolefins, such as the Oxo tridecyl alcohol produced from triisobutylene or tetrapropylene. Water insoluble phenols and naphthols may be used. Amines include decyl-, octadecyl-, dioctyl-, dibutyl-, N-cyclohexyl-N-mono-, and di-alkylol-amines, rosin amines and the like. The amides which are usable are generally those produced from the acids listed above. Such compounds, including their conversion into the polyglycol-containing non-ionic surface active agent, by treatment with ethylene oxide, propylene oxide and the like, or substances forming the same, such as halohydrins, are described more fully in U.S. Patent 1,970,578.

There may also be used polyoxyalkylene derivatives of organic mercapto compounds such as the products described in U.S. Patent 2,205,021, i.e., the polyoxyalkylene derivatives of such mercapto compounds as dodecyl mercaptan, oleyl mercaptan, cetyl mercaptan, decyl mercaptan and thiophenols, thionaphthols, benzomercaptan, and the like. Also, the polyoxyalkylene derivatives of carboxylic acid amides, described in U.S. Patent 2,085,706, of sulfonamides, described in U.S. Patent 2,002,613, or of sulfonic acids, described in U.S. Patent 2,266,141 may be employed if desired. Similarly, the surface active polyoxyalkylene derivatives disclosed in U.S. Patent 2,677,700 may also be employed in the instant invention. Numerous polyoxyalkylenated phenolic compounds containing one or more alkyl substituents are also disclosed in U.S. Patents 2,213,477 and 2,593,112, those preferred being polyoxyalkylene derivatives of alkyl phenolic compounds in which the total number of alkyl carbons atoms is between 4 and 20 such as nonyl phenol, dinonyl phenol and the like.

As described in the aforementioned patents, the organic compound containing a reactive hydrogen atom, and usually at least 6 carbon atoms, is reacted in known manner with a suitable ethylene glycol, halohydrin or with the required number of moles of alkylene oxide to produce the non-ionic surface active agents employed in the instant invention. Since the reaction is substantially quantitative, the molecular proportions of oxyalkylenating agent and reactive hydrogen-containing compound employed determine the average oxyalkylene chain length of the resulting surface active agent, although it will be understood that the product is a mixture of derivatives of varying oxyalkylene chain length. The optimum oxyalkylene chain length will in any particular instance be determined mainly by the particular compound being oxyalkylated, the maintenance of a proper balance usually requiring increased amounts of alkylene oxide with higher molecular weight reactants, the other components of the compositions of the instant invention, the hardness of the water employed for solution, acidification (diazotization) and/or dyeing, and the like.

In general, these non-ionic surface active agents may be represented by the formula

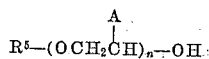

$$R^5-(OCH_2\overset{A}{C}H)_n-OH$$

wherein $R^5$ is the residue of an organic compound containing at least 6 carbon atoms and a reactive hydrogen atom; A is hydrogen or lower alkyl such as methyl, ethyl or the like; and $n$ represents the number of oxyalkylene groups sufficient to render the resulting polyoxyalkylenated derivative readily water-dispersible, preferably water soluble. This value may range from about 2 to 100.

The water-soluble cationic surface active quaternary ammonium compounds operative in the instant invention are also well known in the art, being generally quaternary ammonium compounds containing at least one high molecular weight radical of at least 8 carbon atoms bonded to the nitrogen atom, and an anion. They may accordingly be represented by the formula

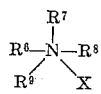

$$\underset{R^9\quad X}{\overset{R^7}{R^6-N-R^8}}$$

wherein $R^6$ is a high molecular weight radical of at least 8 carbon atoms; $R^7$, $R^8$ and $R^9$ are organic radicals; and X is an anion. In this formula, the high molecular weight radical $R^6$ may be saturated or unsaturated and may contain or be interrupted by hetero atoms such as oxygen, sulfur, and nitrogen, aromatic and cycloaliphatic groups, and the like. $R^7$, $R^8$ and $R^9$ are preferably lower molecular weight radicals, although one of them may also be a high molecular weight radical. X in the formula may be hydroxyl, chloride, bromide, iodide, mono-, di- or tribasic phosphate, acetate, formate, lactate, gluconate, sulfate, nitrate, cyanide, borate, alkyl sulfate, alkyl or aryl sulfonate, benzoate or the like. As stated above, these compounds are well known and may be produced in known manner, for example by quaternizing a tertiary amine of the formula $NR^6R^7R^8$ by reaction with a compound having the formula $R^9X$. Cationic surface active quaternary ammonium compounds operative in the compositions of the instant invention, and their methods of production are disclosed in the prior art, including U.S. Patents 1,883,042, 2,060,850, 2,086,585, 2,087,131, 2,087,132, 2,108,765, 2,127,476, 2,129,264, 2,137,314, 2,215,352, 2,309,592 and 2,374,213.

The preferred quaternary ammonium compounds for use in the compositions of the instant invention are those wherein $R^6$ is a long chain hydrocarbon radical of from 8 to 18 carbon atoms, as derived for example from cocoanut, palm, soybean, or castor oil, tallow or the like; $R^7$ and $R^8$ are lower alkyl such as methyl or ethyl, lower alkylol such as ethanol, or polyoxyalkylene alkanol containing up to 5 oxyalkylene, such as oxyethylene groups and the like; $R^9$ is benzyl or lower alkyl such as methyl or ethyl; and X is chloride. The following quaternary ammonium compounds which may be employed in the instant invention are given for illustrative purposes only: dimethyl-decyl-benzyl-ammonium chloride, dimethyl-dodecyl-benzyl-ammonium chloride, diethyl-dodecyl-benzyl-ammonium bromide, triethyl-dodecyl-ammonium chloride, allyl-dibutyl-dodecyl-ammonium bromide, methyl-diallyl-dodecyl-ammonium iodide, triethyl-dodecyloxymethyl-ammonium chloride, dibenzyl-hydroxyethyl-dodecyloxyethyl-ammonium chloride, diethyl - benzylthioethyl-dodecyl-ammonium chloride, diethyl-benzyl-dodecylthioethyl-ammonium chloride, dibutyl-allyl-dodecyloxymethyl-ammonium chloride, diethyl-cyclohexyl-dodecyloxymethyl-ammonium chloride, trihydroxyethyl-dodecyl-ammonium chloride, dimethyl-tetradecyl-benzyl-ammonium chloride, diethyl-pentadecyl-benzyl-ammonium bromide, oleyl - diethyl-triethyleneoxyethyl-benzyl-ammonium chloride, oleyl-diethyltriethyleneoxyethyl-methyl ammonium sulfate, hydroxyethyl-ethoxyethyl-dilauryl-ammonium chloride, stearyl - hydroxyethyl - ethoxyethyl-benzyl-ammonium chloride, stearyl - dihydroxyethyl-benzyl-ammonium chloride, and the like.

The method of mixing the various components of the compositions of the instant invention is not particularly critical, but in the preferred manner, a solution of the diazotizable primary amine compound in the inert, organic, water-miscible solvent is prepared and the nitrite component, if desired dissolved in water, is admixed therewith. Optimum results are obtained when the above-described nonionic surface active agent is included in the solution of diazotizable primary amine compound in the inert, organic, water-miscible solvent and the above-described cationic surface active compound included with the nitrite component followed by incorporation of the various components together. In most cases, the pH of the above-described compositions of this invention is at least 7 and on the alkaline side whereby premature generation of nitrous acid from the nitrite component is prevented. Accordingly, adjustment of the pH by addition of basic substances is usually unnecessary. It will be understood that other substances which do not substantially alter the desired functions and properties of these compositions may be added thereto without departing from the spirit and scope of the instant invention.

The compositions of the instant invention are readily susceptible of packing and shipping to the dyer or printer. Upon acidification with an aqueous solution of an acidic substance, preferably but not necessarily at temperatures of about 32 to 80° F., a diazo solution is readily produced which is clear and does not tar or foam in dyeing and which is stable for several hours. Hydrochloric acid is the preferred acidic substance for this purpose, although other such substances may be employed such as formic acid, acetic acid, oxalic acid, lactic acid, tartaric acid, chloroacetic acid, sulfuric acid, phosphoric acid and the like. Generally, at least 2 and usually about 2½ moles of acid for each mole of diazotizable amine compound may be employed.

The diazo solution is then adjusted, if desired, with respect to pH and/or concentration and may be employed in known manner for reaction with an ice color coupling component. These latter components may be characterized as compounds containing an active methylene group, an enolizable keto group, or an aromatic hydroxy group.

Such coupling components generally include the phenols, naphthols, pyrazolones, hydroxybenzofluorenones, benzonaphthols, and various N-substituted amides, which are capable of coupling such as arylides (e.g. anilides, etc.) of 3-hydroxy-2-naphthoic acid and its 5,6,7,8-tetrahydro-derivative, 3-hydroxy-2-anthroic acid, hydroxycarbazole-carboxylic acid, hydroxybenzocarbazolecarboxylic acid, acetoacetic acid, benzoylacetic acid, furoylacetic acid, terephthaloyl - bis - acetic acid, hydroxydibenzofuran-carboxylic acid, hydroxydibenzothiophenecarboxylic acid, and the like.

The following examples are illustrative of the instant invention and are not to be regarded as limitative. All parts and proportions mentioned herein, in the examples and in the appended claims are by weight unless otherwise indicated. In the examples, non-ionic Agent A is the condensation product of 1 mole of castor oil with about 40 moles of ethylene oxide and cationic Agent B is a 50% aqueous solution of long chain alkyl dimethyl benzyl ammonium chlorides in which the alkyl groups contain from 8 to 18 carbon atoms with an average 12 to 14 carbon atom content as derived for example from cocoanut oil or the like.

*Example 1*

18.2 g. 5-chloro-o-toluidine, 10.0 g. nonionic Agent A, 13.0 g. glycol monoethyl ether and 18.2 g. diethylene glycol are combined and stirred to solution. To this is then added a solution containing 20.7 g. diisopropylammonium nitrite dissolved in 10.0 g. water and 9.0 g. cationic Agent B.

This solution is made up to 100 cc. with water. The resulting solution remains clear after 6 months storage under varying temperature conditions, including storage at refrigeration temperature.

The solution is acidified with HCl to a pH of about 2 and at a temperature of below about 10° C. Cotton which has previously been padded with an alkaline naphtholating solution of Naphthol AS–D (3-hydroxy-2-naphthoic acid o-toluidide) is immersed in this bath, withdrawn, rinsed and dried. A bright red dyeing is obtained.

*Example 2*

Example 1 is repeated, using a solution of 18.7 g. dicyclhohexylammonium nitrite, 30 g. water and 9.0 g. cationic Agent B, heated and stirred to solution, instead of the diisopropylammonium nitrite solution, and only 10 g. of the 5 chloro-o-toluidine. A stable solution is obtained which has excellent stability on storage for 4 months.

*Example 3*

16.0 g. 4-chloro-2-nitroaniline, 19.0 g. nonionic Agent A, and 30.0 g. glycol monoethyl ether are combined and stirred to solution. To it is added a solution containing 15.4 g. diisopropylammonium nitrite, 10.9 g. water and 8.0 cationic Agent B.

This solution is made up to 100 cc. with water. The resulting solution is clear, and remains clear on storage for 4 months under varying temperature conditions.

*Example 4*

10.6 g. glycol monoethyl ether, 21.6 g. dimethyl formamide, 18.8 g. nonionic Agent A, and 20.0 g. amino-azotoluene are combined and stirred to solution. To this solution is added a solution containing 14.5 g. diisopropylammonium nitrite, 6.6 g. water, and 8.1 g. cationic Agent B. The resulting solution is made up to 100 cc. with water.

The solution is stable on storage for 4 months under varying conditions of temperature and gives a clear diazo solution when treated with an excess of hydrochloric acid.

*Example 5*

Example 4 is repeated, but substituting 28 g. N-methyl-2-pyrrolidone for the dimethyl formamide. Similar results are obtained.

*Example 6*

Example 4 is repeated, but substituting 14 g. formamide for the dimethyl formamide. Similar results are obtained.

*Example 7*

10.6 g. glycol monoethyl ether, 21.6 g. dimethyl-formamide, 10.0 g. nonionic Agent A, and 25.0 g. p-toluidine are combined and stirred to solution. To this solution is added a solution of 42.0 g. diisopropylammonium nitrite, 10 g. water, and 4.0 g. cationic Agent B. The resulting solution is stable on storage and gives a clear diazo solution when treated with an excess of hydrochloric acid.

*Example 8*

Example 1 is repeated employing instead of the 5-chloro-o-toluidine, 12 g. o-anisidine. Similar results are obtained.

In the following examples, the procedure of Example 4 is repeated, the aminoazotoluene being substituted by the stated diazotizable amine compound:

| | Example |
|---|---|
| 22.5 g. 4-benzoylamino-2,5-diethoxyaniline | 9 |
| 34 g. 4-cyano-2,5-dimethoxyaniline | 10 |
| 16.6 g. 4-carbamyl-o-anisidine | 11 |
| 23.7 g. cresidine | 12 |
| 23.7 g. p-phenetidine | 13 |

In all cases, clear solutions are formed which have a high degree of stability on storage.

*Examples 14 through 18*

The diazotizable amine compounds of Examples 9-13, respectively, are substituted for the 5-chloro-toluidine in the procedure of Example 1. Similar results are in all cases obtained.

*Example 19*

Example 4 is repeated, employing 25 g. dianisidine instead of the aminoazotoluene and using 14 g. of the diisopropylammonium nitrite. Similar results are obtained

*Example 20*

Example 4 is repeated, employing 18.2 g. 5-chloro-o-toluidine instead of the aminoazotoluene and 14.5 g. triethylammonium nitrite instead of the diisopropylammonium nitrite. Similar results are obtained.

*Example 21*

Example 4 is repeated, employing 21 g. diamyl-ammonium nitrite, 15 g. water and 8.1 g. cationic Agent B, heated and stirred to solution instead of the diisopropyl-ammonium nitrite solution. Similar results are obtained.

*Example 22*

12.5 g. p-toluidine, 5 g. nonionic Agent A, 2 g. non-ionic Agent B, 19 g. diisopropylammonium nitrite, 32.8 g. glycolmonoethyl ether and 64.5 g. dimethylformamide are combined and heated to solution at 35° C. with stirring. It withstands cooling below room temperature without precipitation.

This invention has been disclosed with respect to certain preferred embodiments, and there will become obvious to persons skilled in the art various modifications, equivalents or variations thereof which are intended to be included within the spirit and scope of this invention.

We claim:

1. A composition having a pH of at least about 7, comprising, by weight, about 5 to 35% of a diazotizable primary amine compound devoid of solubilizing groups, a nitrite component selected from the group consisting of nitrous acid salts stable and soluble in neutral and alkaline solution and characterized by the formula

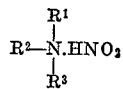

wherein $R^1$ and $R^2$ are selected from the group consisting of lower alkyl, cycloalkyl, aralkyl, and when taken together with each other, the carbon atoms necessary to complete with the central N atom, a 5 to 6 membered heterocycle; $R^3$ is selected from the group consisting of hydrogen, lower alkyl, cycloalkyl, and aralkyl; and $R^1$, $R^2$ and $R^3$ contain a total of no more than about 16 carbon atoms, and at least 50% mixtures thereof with an alkali metal nitrite, the total nitrite being in an amount at least sufficient to diazotize said diazotizable primary amine compound upon acidification, and an amount of an inert, organic, water-miscible solvent for said diazotizable primary amine compound within the range of about 5 to 45% by weight of the composition and sufficient to yield a substantially stable liquid dispersion.

2. A composition as defined in claim 1 in which said nitrous acid salt is diisopropylammonium nitrite.

3. A composition as defined in claim 1 in which said nitrous acid salt is triethylammonium nitrite.

4. A composition as defined in claim 1 in which said nitrous acid salt is dimethylammonium nitrite.

5. A composition as defined in claim 1 in which said nitrous acid salt is diethylammonium nitrite.

6. A composition as defined in claim 1 in which said nitrous acid salt is dicyclohexylammonium nitrite.

7. A composition as defined in claim 1 in which said solvent is glycol monoethyl ether.

8. A composition as defined in claim 1 in which said solvent is dimethyl formamide.

9. A composition as defined in claim 1 in which said solvent is formamide.

10. A composition as defined in claim 1 in which said solvent is N-methyl-2-pyrrolidone.

11. A composition as defined in claim 1 containing about 1 to 3 parts of water for each part of said nitrite component.

12. A composition having a pH of at least about 7 comprising, by weight, about 5 to 35% of a diazotizable primary amine compound devoid of solubilizing groups, a nitrite component selected from the group consisting of nitrous acid salts stable and soluble in neutral and alkaline solution and characterized by the formula

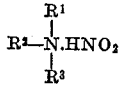

wherein $R^1$ and $R^2$ are selected from the group consisting of lower alkyl, cycloalkyl, aralkyl, and when taken together with each other, the carbon atoms necessary to complete with the central N atom, a 5 to 6 membered heterocycle; $R^3$ is selected from the group consisting of hydrogen, lower alkyl, cycloalkyl, and aralkyl; and $R^1$, $R^2$ and $R^3$ contain a total of no more than about 16 carbon atoms, and at least 50% mixtures thereof with an alkali metal nitrite, in an amount at least sufficient to diazotize said diazotizable primary amine compound on acidification, about 10 to 50% of a mixture of a nonionic surface active agent containing a polyoxyalkylene chain and derived from a reactive hydrogen-containing compound, and a water-soluble cationic surface active quaternary ammonium compound, such mixture containing about 0.2 to 1 part of said cationic compound for each part of said nonionic agent, and an amount of an inert, organic, water-miscible solvent for said diazotizable aromatic amine compound within the range of about 5 to 45% by weight of the composition and sufficient to yield a substantially stable liquid dispersion.

13. A composition as defined in claim 12 in which said nonionic surface active agent is the condensation product of 1 mole of castor oil with about 40 moles of ethylene oxide.

14. A composition as defined in claim 12 in which said quaternary ammonium compound is an alkyl dimethyl benzyl ammonium chloride in which the alkyl group contains from 8 to 18 carbon atoms.

15. A composition as defined in claim 12 containing about 1 to 3 parts of water for each part of said nitrite component.

References Cited in the file of this patent

UNITED STATES PATENTS

| | | |
|---|---|---|
| 2,074,380 | Flett | Mar. 23, 1937 |
| 2,734,793 | Marnon | Feb. 14, 1956 |

FOREIGN PATENTS

| | | |
|---|---|---|
| 668,961 | Great Britain | Mar. 26, 1952 |
| 230,891 | Switzerland | May 16, 1944 |
| 1,095,941 | France | June 7, 1955 |

UNITED STATES PATENT OFFICE

CERTIFICATE OF CORRECTION

Patent No. 2,893,815            July 7, 1959

Lester N. Stanley et al.

It is hereby certified that error appears in the printed specification of the above numbered patent requiring correction and that the said Letters Patent should read as corrected below.

Column 6, lines 1 and 2, for "2,215,352" read -- 2,214,352 --; lines 17 and 18, for "triethyl-dodecyl-ammonium chloride," read -- trimethyl-dodecyl-ammonium chloride, --.

Signed and sealed this 4th day of April 1961.

(SEAL)
Attest:    ERNEST W. SWIDER

Attesting Officer                    ARTHUR W. CROCKER
                                      Acting Commissioner of Patents